United States Patent [19]
Nytomt

[11] Patent Number: 5,600,956
[45] Date of Patent: Feb. 11, 1997

[54] ARRANGEMENT AND METHOD FOR REGULATION OF THE IDLE SPEED AND CHARGE PRESSURE IN A SUPERCHARGED COMBUSTION ENGINE

[75] Inventor: Jan Nytomt, Amal, Sweden

[73] Assignee: Mecel AB, Sweden

[21] Appl. No.: 392,994

[22] PCT Filed: Jun. 30, 1994

[86] PCT No.: PCT/SE94/00647

§ 371 Date: Mar. 7, 1995

§ 102(e) Date: Mar. 7, 1995

[87] PCT Pub. No.: WO95/02119

PCT Pub. Date: Jan. 19, 1995

[30] Foreign Application Priority Data

Jul. 8, 1993 [SE] Sweden ................. 9302365

[51] Int. Cl.$^6$ ............................................. F02B 37/12
[52] U.S. Cl. ............................................................ 60/602
[58] Field of Search ............................. 660/600, 601, 660/602, 603; 123/564

[56] References Cited

U.S. PATENT DOCUMENTS 3,568,435  3/1971  May ..................... 123/564
4,528,815  7/1985  Arnaud ..................... 60/600

FOREIGN PATENT DOCUMENTS 0189121    7/1986  European Pat. Off. ..
0253076    1/1988  European Pat. Off. ..
WO88/09432 12/1988  WIPO .
WO91/08388  6/1991  WIPO .

Primary Examiner—Michael Koczo
Attorney, Agent, or Firm—Ostrolenk, Faber, Gerb & Soffen, LLP

[57] ABSTRACT

An arrangement and method for regulation of idle speed and charge pressure in a supercharged combustion engine (1) which engine includes an idle speed valve (20) arranged in a shunt channel (21) by-passing the throttle (9) and a gate valve (10) regulated by a pressure controlled diaphragm pot for regulating of the supercharger. The valve (20) is used both for regulation of idle speed and charge pressure by an arrangement of ducting (23, 24, 25, 19) and a shut-off valve (26). A control device (31) includes different functions for regulation of idle speed and charge pressure. The function selected for regulation by the control device depends on an engine parameter, such as throttle position, detected by a throttle position sensor (16).

11 Claims, 1 Drawing Sheet

ARRANGEMENT AND METHOD FOR REGULATION OF THE IDLE SPEED AND CHARGE PRESSURE IN A SUPERCHARGED COMBUSTION ENGINE

BACKGROUND OF THE INVENTION

This invention relates to an arrangement and method for the regulation of idle speed and charge pressure in a supercharged combustion engine.

1. Prior Art

In motor vehicles a lot of different regulating valves are used for regulation of, for example, the combustion engine of the motor vehicle. Due to different demands in aspects of accuracy and response and often need for simultaneous regulation with different orders of regulation demanded for the regulated functions in question, a large amount of different regulating valves are often necessitated. A typical regulating valve could be found in the inlet manifold of the engine, with the regulating valve being arranged in a shunt channel bypassing the throttle. This regulating valve is used for controlling the idle speed, and exhibits a very rapid response and accuracy in order to meet sudden changes in speed. These changes in speed could be induced by a sudden increase in load put upon the engine from different engine driven accessories such as air conditioning, generator, etc. Another typical regulating valve could be found in supercharged turbo engines, where a regulating valve known as a waste-gate is dumping excessive charge pressure. The waste-gate is preferably regulated by a pressure controlled diaphragm pot, pressurized from the inlet manifold of the engine in a regulated manner by a special regulating valve.

Both of the above mentioned regulating valves conventionally includes individual controls for regulation of respective regulating valve depending on different engine parameters.

2. Summary of the Invention

An object of the present invention is to reduce the number of regulating valves and controls for a supercharged combustion engine.

Another object is to obtain an improved regulation of the charge pressure in aspects of accuracy and response at a low cost.

In order to obtain these objects, the inventive arrangement includes a shunt channel connected to the inlet manifold of the engine to enable a throttle located in the inlet manifold to be by-passed. An idle speed valve is arranged in the shunt channel for selectively opening and closing the shunt channel. A selectively operable charge control regulating valve is provided for controlling the charge pressure in the inlet manifold, the charge pressure being a function of the degree of opening of the charge control valve. Pressure responsive means are provided for regulating the degree of opening of the charge control valve. A supply duct is connected between the shunt channel and the pressure responsive means for selectively supplying pressure to the pressure responsive means, the supply duct being connected to the shunt channel at a point downstream of the idle speed valve.

In accordance with the inventive method, the idle speed or charge pressure of a super-charged engine is regulated by deflecting air from the inlet manifold upstream of throttle to either a diaphragm pot used to control a regulating valve used to control charge pressure or to the inlet manifold downstream of the throttle.

Other features and advantages of the present invention will become apparent from the following description of the invention which refers to the accompanying drawings.

DETAILED DESCRIPTION OF THE PREFERRED EMBODIMENT

Figure 1:
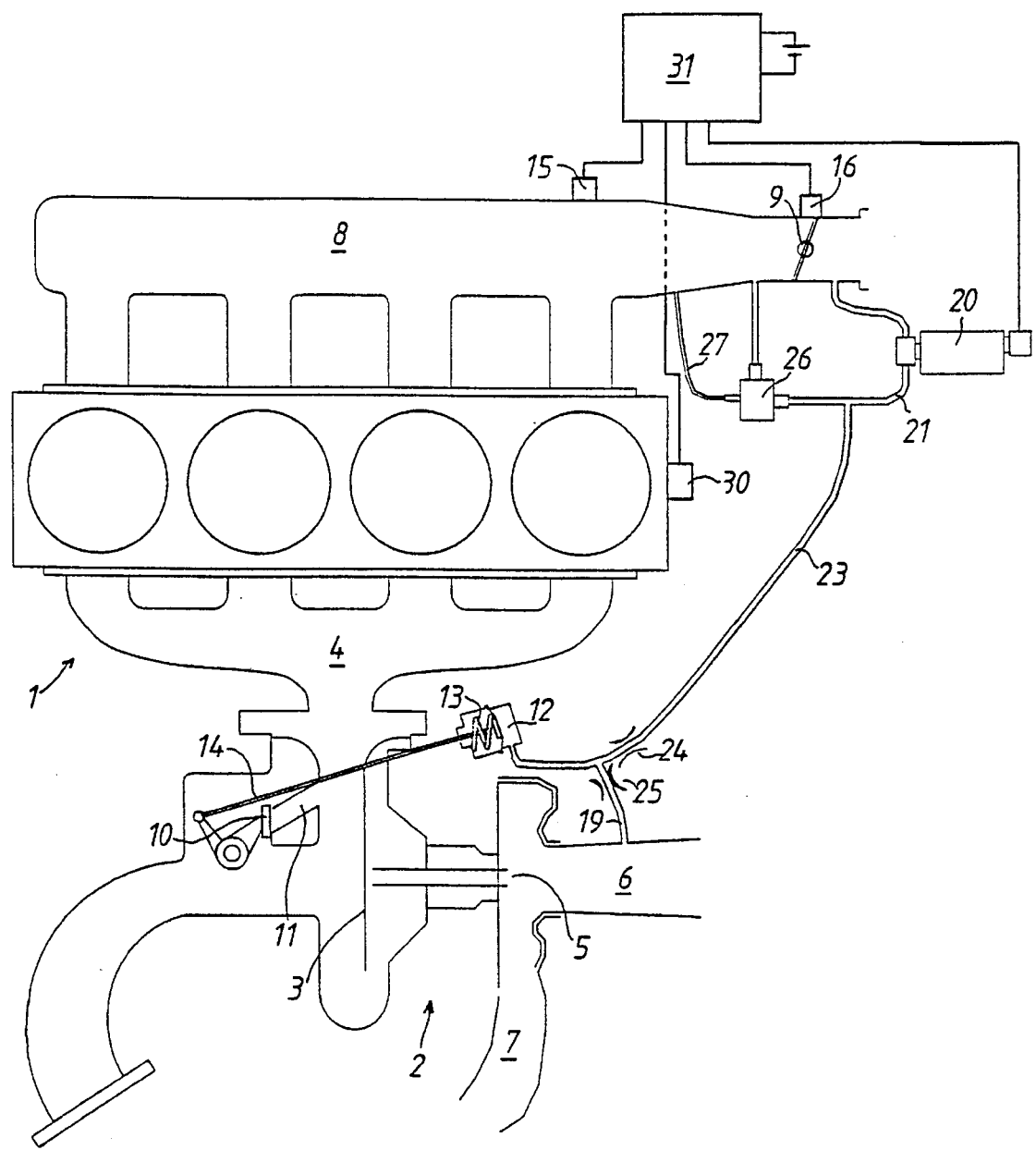
FIG. 1, shows schematically an engine with the inventive arrangement for regulation of idle speed and charge pressure.

FIG. 1 shows a four cylinder supercharged combustion engine 1. The combustion engine is equipped with a supercharging unit 2, hereafter called supercharger, including an exhaust driven turbine 3 arranged to receive the exhaust from an exhaust collector 4, and a compressor 5 driven by the turbine for pressurizing the inlet air in the inlet manifold of the combustion engine downstream of the compressor.

The suction side 6 of the compressor is conventionally connected to necessary air filters(not shown), and the pressure side 7 is connected in a conventional manner, but not shown, to the inlet manifold via a throttle 9. The supercharger is regulated in a conventional manner by a waste-gate valve 10, being able to conduct the exhaust flow in a shunt channel 11 by-passing the turbine 3. The waste-gate valve is regulated by a pressure controlled diaphragm pot 12, which is connected to a regulating rod 14 pretensioned by a spring 13 keeping the waste-gate valve closed when the diaphragm pot is not pressurized.

Heretofore, a special regulating valve has been used to control the diaphragm pot. The special regulating valve which was connected to the inlet manifold of the engine, could pressurize the diaphragm pot and open the waste-gate valve when the charge pressure became excessive, thereby reducing the charge pressure by the exhaust flow which by-passed the turbine.

The arrangement also includes a conventional device for idle speed control including a preferably electrically controlled regulating valve 20 for idle speed control arranged in a shunt channel 21 by-passing the throttle 9, the idle speed regulating valve 20 being regulated depending on detected engine parameters such that the idle speed could be kept constant during idling. During idle the throttle 9 is closed, and the engine only obtains a certain leakage flow of inlet air. The engine, which also is driving different accessories such as cooling units and generators, could be exposed to pulsating loads by sudden activation of AC-evaporator or increased electric load on the generator, which necessitates that the leakage flow be regulated in order to maintain the speed of the engine constant. A simple electric regulation could include a control unit 31 which, via a speed transducer 30 on the crankshaft of the engine, regulates the idle speed valve 20 such that the idle speed is maintained.

The inventive arrangement according to FIG. 1 includes a supply duct 23 which is connected to the shunt channel 21 downstream of the idle speed valve 20. The supply duct 23 is in its other end connected to the diaphragm pot 12 of the waste-gate valve 10, such that the diaphragm pot could be pressurized via the idle speed valve 20. The supply duct 23 is preferably equipped with a restriction 24, which prevents an uncontrolled flow being developed in the supply duct 23 during regulation of the idle speed when the flow should by-pass the throttle 9 in the shunt channel 21. During regulation of idle speed a substantial negative pressure exists in the inlet manifold, and a restriction 24 is sufficient in order to prevent that air is drawn through the supply duct 23 from the suction side 6 of the compressor. At idle the negative pressure is highest close to the cylinders. The diaphragm pot 12 could also be vented to the suction side 6 of the compressor via a venting duct 19, so that the pressure in the diaphragm pot could be evacuated rapidly. To be able to pressurize the diaphragm pot through the supply duct 23, a second restriction 25 is arranged in the venting duct 19.

A shut-off valve 26 is arranged in the shunt channel 21 downstream of the connection point of the supply duct 23 in order to establish that the compressed and pressurized air, at part load and full load conditions, should be conducted to the diaphragm pot 12 through the idle speed valve 20 and the supply duct 23 in a controlled manner. Compressed inlet air could hereby not flow down to the diaphragm pot from the outlet of the shunt channel downstream of the throttle 9. The shut-off valve 26 could preferably be pressure controlled by the inlet pressure in the inlet manifold. This could be obtained by a control duct 27, which could be connected downstream of the throttle as shown in FIG. 1. Such a pressure controlled shut-off valve 26 would hereby be autonomous without any external regulator. Alternatively the shut-off valve 26 could be electrically controlled by the control unit 31 dependent on a pressure sensor 15 arranged in the inlet manifold.

By the inventive arrangement one and the same regulating valve could be used for regulation of idle speed as well as for regulation of charge pressure. Because idle speed regulation only takes place when the throttle is closed, or with substantially closed throttle, when the exhaust driven supercharger is not able to establish a charging which necessitates opening of the waste-gate, and because the regulation of charge pressure is necessary only during throttle-up movements in the part load and full load ranges, when the throttle is open, no conflicts in the regulation scheme occurs. During idling only idle speed regulation occurs and during part load-full load only regulation of the charge pressure occurs.

The idle speed valve 20 is preferably regulated with an electronic control device 31 including at least two functions for regulation, with one function dedicated to idle speed regulation and the other function to charge pressure regulation. The control unit could select the appropriate function for control depending upon the throttle position, which could be detected with a throttle position sensor 16. With a detected substantially closed throttle the function for idle speed regulation is selected and with detected throttle positions outside the idling position, such as part load and full load, the control unit switches to charge pressure regulation by regulating the pressure in the diaphragm pot 12. The regulation of the charge pressure could for example be controlled by the control device 31 collecting charge pressure information from a pressure sensor 15.

The idle speed valve 20 could preferably be a revolving slide valve with a built-on two-step motor, which continuously operates with back and fourth movements and with a maximum stroke of rotation of 90 degrees. The two-step motor receives signals in form of electric pulses from the control device. Due to the continuos movements back and fourth, the opening of the valve could be changed within very small intervals of time. A typical response of a slide valve is opening and closing within approximately 150–200 ms. This enables for the air volume passing the valve to be regulated to an appropriate amount to maintain a constant speed independently of sudden changes in load. These types of valves are comparatively expensive but needed in order to obtain a quick response to changes in load. The regulation valves used for the waste-gate regulation have not been as expensive and also have not possessed the same level of accuracy or quick response. With the inventive arrangement the waste-gate valve could be regulated with improved accuracy and with a quicker response without any additional cost. The inventive arrangement instead possesses a substantial potential for savings because the special regulating valve and its control unit for the waste gate valve could be deleted, and only some few details for the piping and a simple shut-off valve is needed as supplements to the already mounted idle speed valve 20.

The invention is not limited to the embodiment shown by the exemplary embodiment. The shut-off valve 26 shown in the exemplary embodiment could by example be substituted for a two-way valve arranged in the connection point of the supply duct 23 to the shunt channel 21. The two-way valve could open the flow from the regulation valve 20 alternatively to the supply duct or to the inlet manifold downstream of the throttle and could either be pressure controlled or electrically controlled. Such a two-way valve is preferably arranged immediately at the outlet of the regulating valve 20. The invention is not limited to engines where the supercharging is obtained by a compressor driven by an exhaust turbine, with waste gate regulation of exhaust gases by passing the exhaust turbine. The invention could also be implemented in mechanically driven displacement compressors, which level of supercharging is regulated by a inlet slide being movable by a pressure controlled diaphragm pot. Although the present invention has been described in relation to particular embodiment(s) thereof, many other variations and modifications and other uses will become apparent to those skilled in the art. It is preferred, therefore, that the present invention be limited not by the specific disclosure herein, but only by the appended claims.

I claim:

1. An arrangement for regulation of the idle speed of a supercharged combustion engine having an inlet manifold with a throttle positioned therein and for regulation of the charge pressure in the inlet manifold, which arrangement comprises:

(a) a shunt channel connected to the inlet manifold to enable the throttle to be bypassed;

(b) an idle speed valve arranged in the shunt channel for selectively opening and closing the shunt channel;

(c) means including a selectively openable charge control regulating valve for controlling the charge pressure in the inlet manifold the charge pressure being a function of the degree of opening of the charge control valve;

(d) pressure responsive means including a diaphragm pot for regulating the degree of opening of the charge control valve;

(e) a supply duct connected from the shunt channel downstream of the idle speed valve to the pressure responsive means to selectively pressurize the pressure responsive means;

(f) an adjustable flow regulating valve positioned in the shunt channel; and (g) means responsive to pressure arranged in the inlet manifold for adjusting the flow regulating valve.

2. An arrangement according to claim 1, wherein the means responsive to pressure includes a duct connected from the inlet manifold to the adjustable flow regulating valve.

3. An arrangement for regulation of the idle speed of a supercharged combustion engine having an inlet manifold with a throttle positioned therein and for regulation of the charge pressure in the inlet manifold which arrangement comprises:

(a) a shunt channel connected to the inlet manifold to enable the throttle to be by-passed;

(b) an idle speed valve arranged in the shunt channel for selectively opening and closing the shunt channel;

(c) means including a selectively openable charge control regulating valve for controlling the charge pressure in the inlet manifold, the charge pressure being a function of the degree of opening of the charge control valve;

(d) pressure responsive means including a diaphragm pot for regulating the degree of opening of the charge control valve;

(e) a supply duct connected from the shunt channel downstream of the idle speed valve to the pressure responsive means to selectively pressurize the pressure responsive means;

(f) a relief duct is connected from the diaphragm pot to the suction side of a supercharger of the engine to relieve pressure from the diaphragm pot.

4. An arrangement according to claim 3, wherein a restriction is arranged in the relief duct.

5. An arrangement for regulation of the idle speed of a supercharged combustion engine having an inlet manifold with a throttle positioned therein and for regulation of the charge pressure in the inlet manifold, which arrangement comprises:

(a) a shunt channel connected to the inlet manifold to enable the throttle to be by-passed;

(b) an idle speed valve arranged in the shunt channel for selectively opening and closing the shunt channel;

(c) means including a selectively openable charge control regulating valve for controlling the charge pressure in the inlet manifold, the charge pressure being a function of the degree of opening of the charge control valve;

(d) pressure responsive means including a diaphragm pot for regulating the degree of opening of the charge control valve;

(e) a supply duct connected from the shunt channel downstream of the idle speed valve to the pressure responsive means to selectively pressurize the pressure responsive means;

(f) an electronic control unit;

(g) a speed sensor for sensing the speed of the engine, the speed sensor being connected to the electronic control unit; and (h) a pressure sensor arranged in the inlet manifold for sensing the pressure therein, the pressure sensor being connected to the electronic control unit; the electronic control unit being connected to the idle speed valve for selectively regulating the idle speed valve in accordance with two independent functions; one function being based on the speed of the engine sensed by the speed sensor and the other function being based on the pressure in the inlet manifold sensed by the pressure sensor.

6. An arrangement according to claim 5, wherein means are connected to the electronic control unit for controlling the regulation function selected by the electronic control unit.

7. An arrangement according to claim 6, wherein the means for controlling the function of the electronic control unit includes a sensor for detecting the position of the throttle.

8. A method for regulation of idle speed and charge pressure in a supercharged combustion engine which engine includes an inlet manifold with a throttle positioned therein, an idle speed valve arranged in a shunt channel by-passing the throttle and a charge control regulating valve controlled through a pressure controlled diaphragm pot for regulating the charge pressure, which method comprises selectively regulating either the idle speed or the charge pressure by deflection of air from the inlet manifold upstream of the throttle either to the diaphragm pot or to the inlet manifold downstream of the throttle.

9. A method in accordance with claim 8, wherein the air is deflected to the inlet manifold downstream of the throttle during idling of the engine and the air is deflected to the diaphragm pot during part load to full load conditions of the engine.

10. A method in accordance with claim 9, wherein the air deflected to the diaphragm pot is deflected in proportion to the extent necessary for regulation of the charge pressure.

11. A method in accordance with claim 9 wherein air is deflected to either the diaphragm pot or to the inlet manifold downstream of a throttle based upon the speed of the engine.

* * * * *